(12) United States Patent
Zaki

(10) Patent No.: US 7,925,263 B2
(45) Date of Patent: *Apr. 12, 2011

(54) HANDOVER IN A WIRELESS LOCAL AREA NETWORK (WLAN)

(75) Inventor: Maged Zaki, Pierrefonds (CA)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/652,271

(22) Filed: Jan. 11, 2007

(65) Prior Publication Data

US 2007/0111731 A1    May 17, 2007

Related U.S. Application Data

(63) Continuation of application No. 10/931,112, filed on Aug. 31, 2004, now Pat. No. 7,164,915.

(60) Provisional application No. 60/531,513, filed on Dec. 19, 2003.

(51) Int. Cl.
*H04W 36/00* (2009.01)

(52) U.S. Cl. .................................... 455/436

(58) Field of Classification Search .......... 455/437, 455/452.2, 525
See application file for complete search history.

(56) References Cited

U.S. PATENT DOCUMENTS 5,640,677 A * 6/1997 Karlsson ............... 455/434
(Continued)

FOREIGN PATENT DOCUMENTS

EP         1 182 902         2/2002
(Continued)

OTHER PUBLICATIONS 802.11 Working Group of the 802 Committee, *IEEE P802.11n/D1.0; Draft Amendment to Standard [FOR] Information Technology-Telecommunications and Information Exchange Between Systems-Local and Metropolitan Networks-Specific Requiements-Part 11: Wirelesss LAN Medium Access Control (MAC) and Physical Layer (PHY) Specifications: Enhancments for Higher Throughput*, IEEE P802.11n/D1.0 (Mar. 2006).

*Primary Examiner* — Dwayne D Bost
*Assistant Examiner* — Timothy Pham
(74) *Attorney, Agent, or Firm* — Volpe And Koenig, P.C.

(57) ABSTRACT

In triggering a handoff by a wireless transmit/receive unit (WTRU) from a current basic service set (BSS) in a wireless local area network (WLAN), the following are performed. A highest class of traffic service and quality of service (QoS) is determined for the highest class from a basic service set (BSS) beacon. Handoff is terminated and communication is retained with a current BSS when the signal to noise ratio (SNR) or received signal strength (RSS) is greater than a high threshold of the highest class. Other criteria is evaluated to determine whether a handoff is desired when the SNR or RSS is less than the high threshold.

3 Claims, 4 Drawing Sheets

U.S. PATENT DOCUMENTS

| | | |
|---|---|---|
| 5,917,811 A | 6/1999 | Weaver, Jr. et al. |
| 6,341,309 B1 * | 1/2002 | Vaid et al. .................... 709/223 |
| 6,546,252 B1 * | 4/2003 | Jetzek et al. ................. 455/437 |
| 6,594,494 B1 | 7/2003 | Kakehi |
| 6,633,554 B1 | 10/2003 | Dalal |
| 6,674,737 B1 | 1/2004 | Baker |
| 6,745,033 B1 * | 6/2004 | Shah et al. ................... 455/436 |
| 6,944,449 B1 * | 9/2005 | Gandhi et al. ............... 455/425 |
| 2002/0068569 A1 | 6/2002 | Chen et al. |
| 2002/0168980 A1 | 11/2002 | Gwon et al. |
| 2003/0069018 A1 | 4/2003 | Matta et al. |
| 2003/0083069 A1 | 5/2003 | Vadgama |
| 2003/0142651 A1 | 7/2003 | Matta et al. |

FOREIGN PATENT DOCUMENTS

| | | |
|---|---|---|
| EP | 1 206 069 | 5/2002 |
| JP | 2000-295650 | 10/2000 |
| TW | 461203 | 10/2001 |
| WO | 99/51052 | 10/1999 |
| WO | 02/32179 | 4/2002 |

* cited by examiner

HANDOVER IN A WIRELESS LOCAL AREA NETWORK (WLAN)

CROSS REFERENCE TO RELATED APPLICATION(S)

This application is a continuation of U.S. patent application Ser. No. 10/931,112, filed Aug. 31, 2004, which claims the benefit of U.S. provisional application No. 60/531,513, filed Dec. 19, 2003, all of which are incorporated herein by reference as if fully set forth.

FIELD OF INVENTION

The present invention relates wireless communication systems. In particular, the invention relates to handover in such systems.

BACKGROUND

FIG. 1 is a simplified illustration of a wireless transmit/receive unit (WTRU) $14_{1N}$ potentially handing over between two basic service sets (BSSs), $BSS_1$ $12_1$ and $BSS_2$ $12_2$, in a wireless local area network (WLAN). Originally, $BSS_1$ $12_1$ has an access point (AP) $10_1$ and a plurality of WTRUs $14_{11}$ to $14_{1N}$ and $BSS_2$ $12_2$ has an access point (AP) $10_2$ and a plurality of WTRUs $14_{21}$ to $14_{23}$. The WTRU $14_{1N}$ is in wireless communication with AP $10_1$. As illustrated in FIG. 1, both APs $10_2$, $10_1$ are connected to a distribution system 16. To decide whether to handover between BSSs 12, such as $BSS_1$ $12_1$ and $BSS_2$ $12_2$, the WTRU $14_{1N}$ measures the received signal strength (RSS) or signal to noise ratio (SNR) for each $BSS_1$ $12_1$, $12_2$. The $BSS_1$ $12_1$ having the better RSS or SNR is selected for further communication. If $BSS_1$ $12_1$ is selected, the current communication links are maintained, as illustrated as a solid line. If $BSS_2$ $12_2$ is selected, a new link is established with $BSS_2$, as illustrated as a dashed line.

Although this approach most likely provides the WTRU $14_{1N}$ with the strongest link, other criteria may make such a connection undesirable. To illustrate, the BSS having the strongest link may be overloaded and can not meet some quality of service (QoS) requirements of the WTRU $14_{1N}$. Accordingly, it is desirable to have alternate handover schemes.

SUMMARY

In triggering a handoff by a wireless transmit/receive unit (WTRU) from a current basic service set (BSS) in a wireless local area network (WLAN), the following are performed. A highest class of traffic service and quality of service (QoS) is determined for the highest class from a basic service set (BSS) beacon. Handoff is terminated and communication is retained with a current BSS when the signal to noise ratio (SNR) or received signal strength (RSS) is greater than a high threshold of the highest class. Other criteria is evaluated to determine whether a handoff is desired when the SNR or RSS is less than the high threshold.

BRIEF DESCRIPTION OF THE DRAWING(S)

The present invention will be understood from consideration of the accompanying figures, wherein like elements are designated by like numerals, and wherein.

DETAILED DESCRIPTION OF THE PREFERRED EMBODIMENT(S)

Although the features and elements of the present invention are described in the preferred embodiments in particular combinations, each feature or element can be used alone (without the other features and elements of the preferred embodiments) or in various combinations with or without other features and elements of the present invention.

Hereafter, a wireless transmit/receive unit (WTRU) includes but is not limited to a user equipment, station, mobile station, fixed or mobile subscriber unit, pager, or any other type of device capable of operating in a wireless environment. When referred to hereafter, an access point includes but is not limited to a base station, Node-B, site controller, or any other type of interfacing device in a wireless environment. Although the following is discussed with respect to WLANs, the invention can be applied to other wireless networks.

Figure 1:
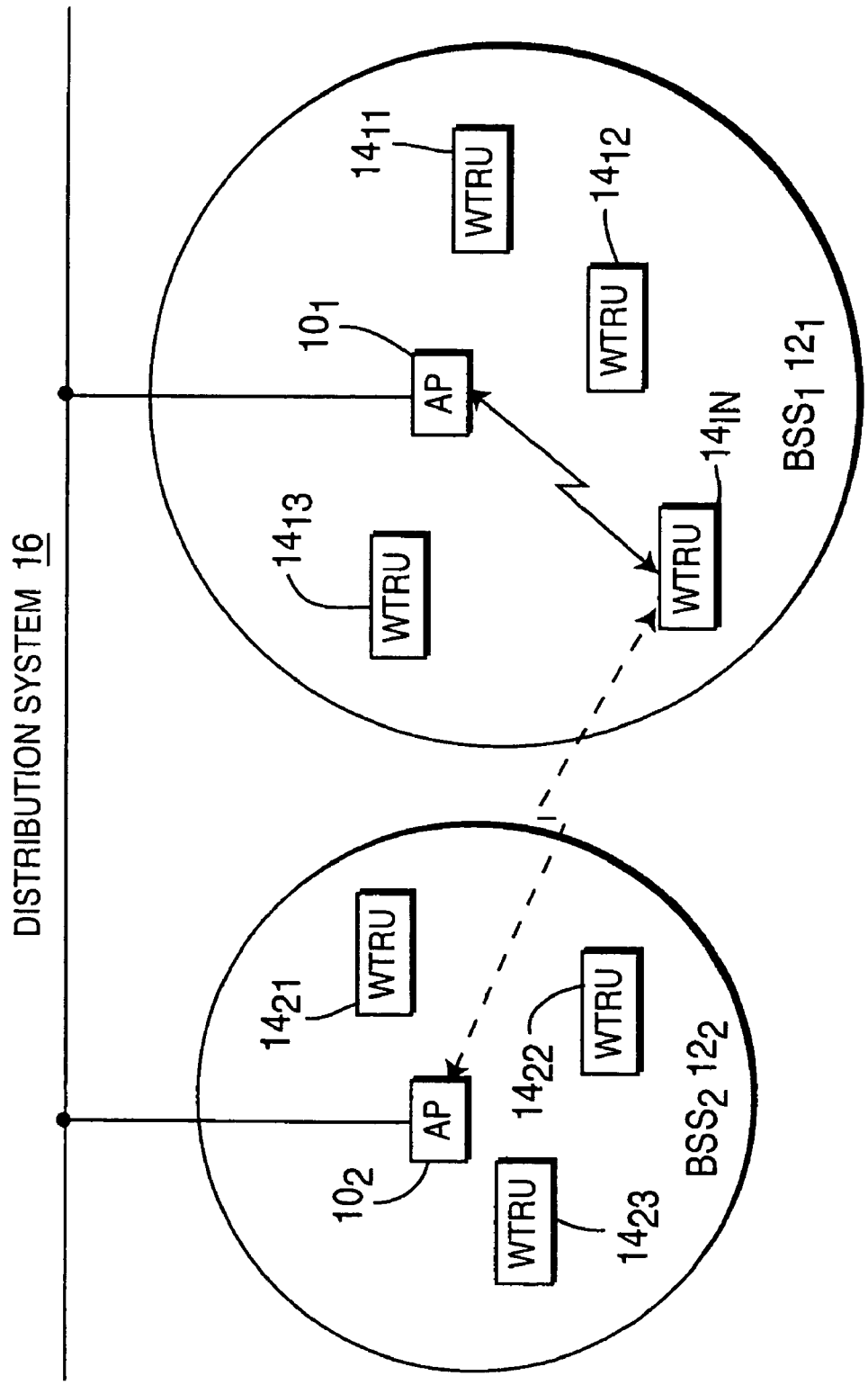
FIG. 1 is an illustration of a WTRU in potential handover.
Figure 2:
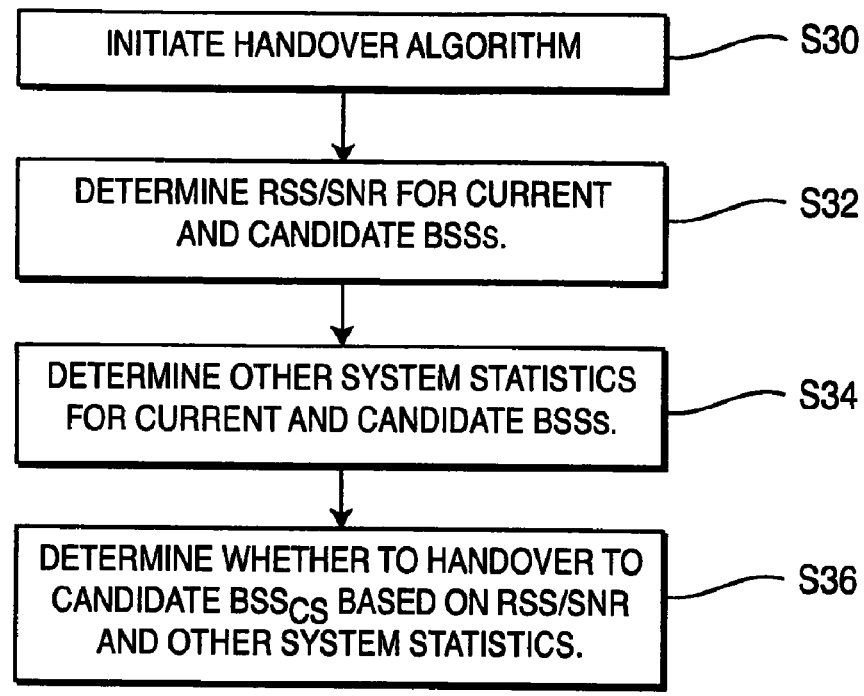
FIG. 2 is a flow chart of an embodiment of a RSS/SNR and other system statistic handover algorithm.

FIG. 2 is an embodiment of a RSS/SNR and other system statistic handover. A WTRU, such as WTRU $14_{1N}$ of FIG. 1, initiates the handover algorithm to determine whether handing over between BSSs 12 is desirable, such as from $BSS_1$ $12_1$ to $BSS_2$ $12_2$, step S30. The RSS and/or SNR is measured for each BSS 12, including the current BSS and any potential handover BSSs, step S32. Other system statistics are measured for each BSS 12, step S34. The other system statistics may relate to the quality of service, such as delay bounds, bandwidth requirements (i.e. data rate), and frame error rate. Based on the RSS/SNR and other system statistics, a handover decision is made, step S36. Typically, the other system statistics are based on the traffic class of the WTRU's services.

Figure 3:
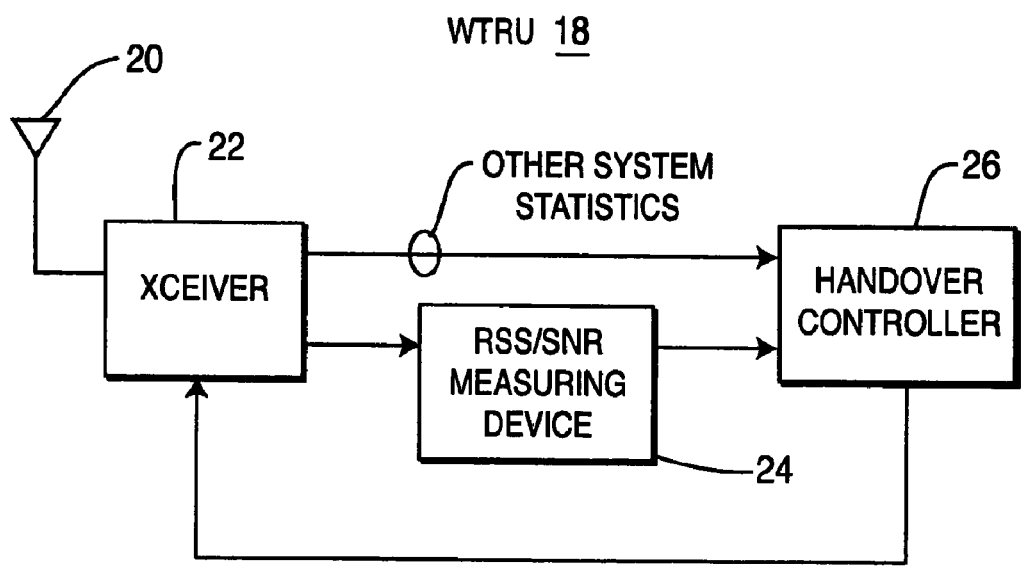
FIG. 3 is a simplified diagram of an embodiment of a WTRU capable of RSS/SNR and other system statistic handover.

FIG. 3 is an embodiment of a WTRU 18 capable of such a handover. The components of FIG. 3 may be implemented on a single integrated circuit (IC), such as an application specific integrated circuit (ASIC), on multiple ICs, by discrete components or a combination of IC(s) and discrete component(s). Wireless signals are received and transmitted over an antenna 20 or antenna array and a transceiver (Xceiver) 22 of the WTRU 18. A RSS/SNR measuring device 24 measures the RSS and/or SNR of each BSS 12. A handover controller 26 receives the RSS/SNR measurements and other system statistics and determines whether a handover to another BSS 12 is desired. The other system statistics may be recovered from received communications, as shown in FIG. 3 or by other means.

Figure 4:
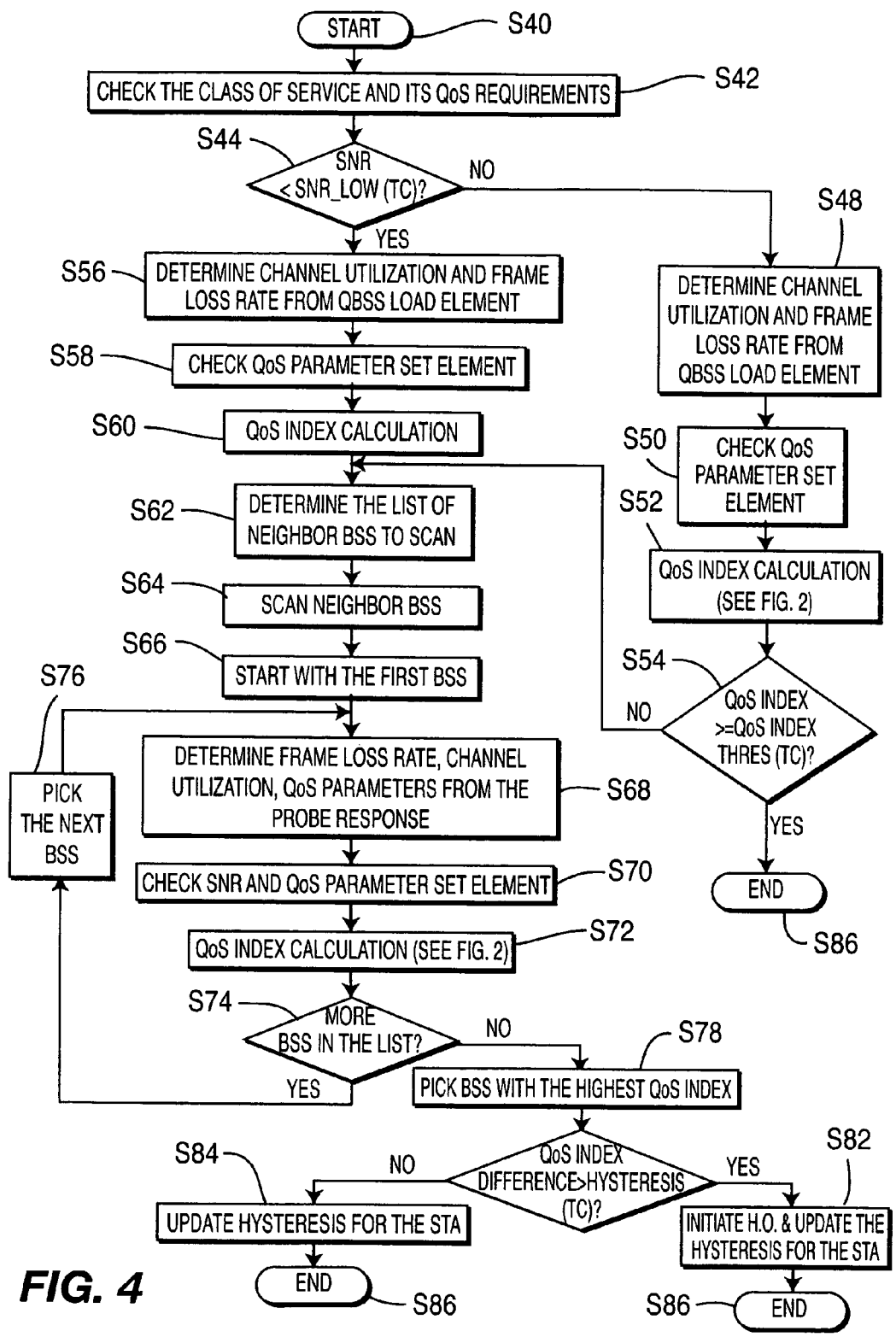
FIG. 4 is a flow chart of a RSS/SNR and other system statistic handover algorithm embodiment.

FIG. 4 is an illustration of a preferred embodiment for RSS/SNR and other system statistic handover. For each traffic channel, QoS characters are defined, such as delay bounds, bandwidth requirements (data rate), and frame error rate. Minimum and maximum values for each parameter are defined for each traffic class. A minimum and maximum value of SNR is also defined for each traffic class. Table 1 illustrates an example of QoS characteristics and SNR values for different traffic classes.

TABLE 1

QoS Characteristics and SNR definition for different traffic classes

|  | Delay (D) | | Data Rate (BW) | | Frame Error Rate (FER) | | SNR | |
| --- | --- | --- | --- | --- | --- | --- | --- | --- |
| Traffic Class_1 | Dmin | Dmax | BWmin | BWmax | FERmin | FERmax | SNRmin | SNRmax |
| — | — | — | — | — | — | — | — | — |
| — | — | — | — | — | — | — | — | — |
| Traffic Class_n | Dmin | Dmax | BWmin | BWmax | FERmin | FERmax | SNRmin | SNRmax |

The handover algorithm is triggered when the SNR value drops below a high SNR threshold, i.e., SNR max, for the given traffic class (TC) associated with the entity seeking a handover, step S40. The TC may be one of those shown in Table 1. The algorithm compares the SNR value with a low SNR threshold and depending on the result acts, generally, as follows.

If the SNR value is between the low and high SNR thresholds, the algorithm checks the QoS index for this traffic class. The QoS index may be derived from any or all the criteria in Table 1 or, alternately, other criteria may be used. If the QoS index is below the QoS index threshold, the WTRU starts scanning neighboring cells to trigger a handover. If the SNR value is higher than the high SNR threshold, the algorithm terminates since link quality is good and there is no need for handover. For SNR values below the low threshold, the WTRU starts scanning neighboring BSSs without comparing the QoS index with the QoS index threshold. Although the above refers to SNR, RSS or a combination of RSS and SNR may be used instead.

Referring to FIG. 4, the highest class of service for traffic at the monitoring WTRU 18 and the QoS requirements of the WTRU 18 are examined, step S42. If the SNR is at or above the low threshold, step S44, the channel utilization and the frame loss rate from the QBSS load element is determined, step S48. The QoS parameter set element is checked, step S50, and the QoS index is calculated, step S52. If the QoS index is greater than a QoS index threshold, the handover algorithm is ended, steps S54, S86. If the QoS index is less than or equal to the threshold, the algorithm proceeds to determining a list of neighboring BSSs 12 to scan as described subsequently, for steps S62 to S84.

If the SNR is below the low threshold, step S44, the channel utilization is determined and frame loss rate derived from the QBSS load element, step S56. The QoS parameter set element is checked, step S58, and the QoS index is calculated, step 60.

A list of neighbor BSSs 12 is determined, step S62, and a scan neighbor routine is initiated, step S64. The first BSS 12 of the list is scanned, step S66. The probe response is obtained from the first BSS 12 and the frame loss rate, channel utilization and QoS parameters are obtained from the probe response, step S68. The SNR and QoS parameter elements are checked, step S70. A QoS index calculation for the first BSS 12 of the neighbors to be scanned is performed, step S72.

In the event that there are more BSSs 12 in the list, step S74, the next BSS 12 is picked, step S76. Steps S68 through S74 are repeated for the next BSS 12.

When there are no more BSSs 12 to be scanned, the BSS 12 with the highest QoS index is picked, at step S78. A difference is taken between the QoS index of the selected BSS 12 and the QoS index of the current BSS 12. To keep the WTRU 18 from frequently handing over between BSSs 12, the QoS index difference value is compared with a hysteresis to determine if it is bigger than the hysteresis, step S80. The hysteresis is preferably a function of the traffic class (TC), although it may be derived by other techniques. If the calculated difference is greater than the last stored hysteresis, the handover to the new cell is initiated and the hysteresis value is reset to its original value, step S82. The handoff algorithm terminates, step S86. If the difference between the current and target cell QoS indexes is smaller than the hysteresis, the hysteresis value is updated, step S84. Preferably, the hysteresis value is decreased in order to enable the WTRU 18 utilizing the handover algorithm to have a better chance to obtain a handover to a new cell in the event that the WTRU 18 continues to experience poor service.

Figure 5:
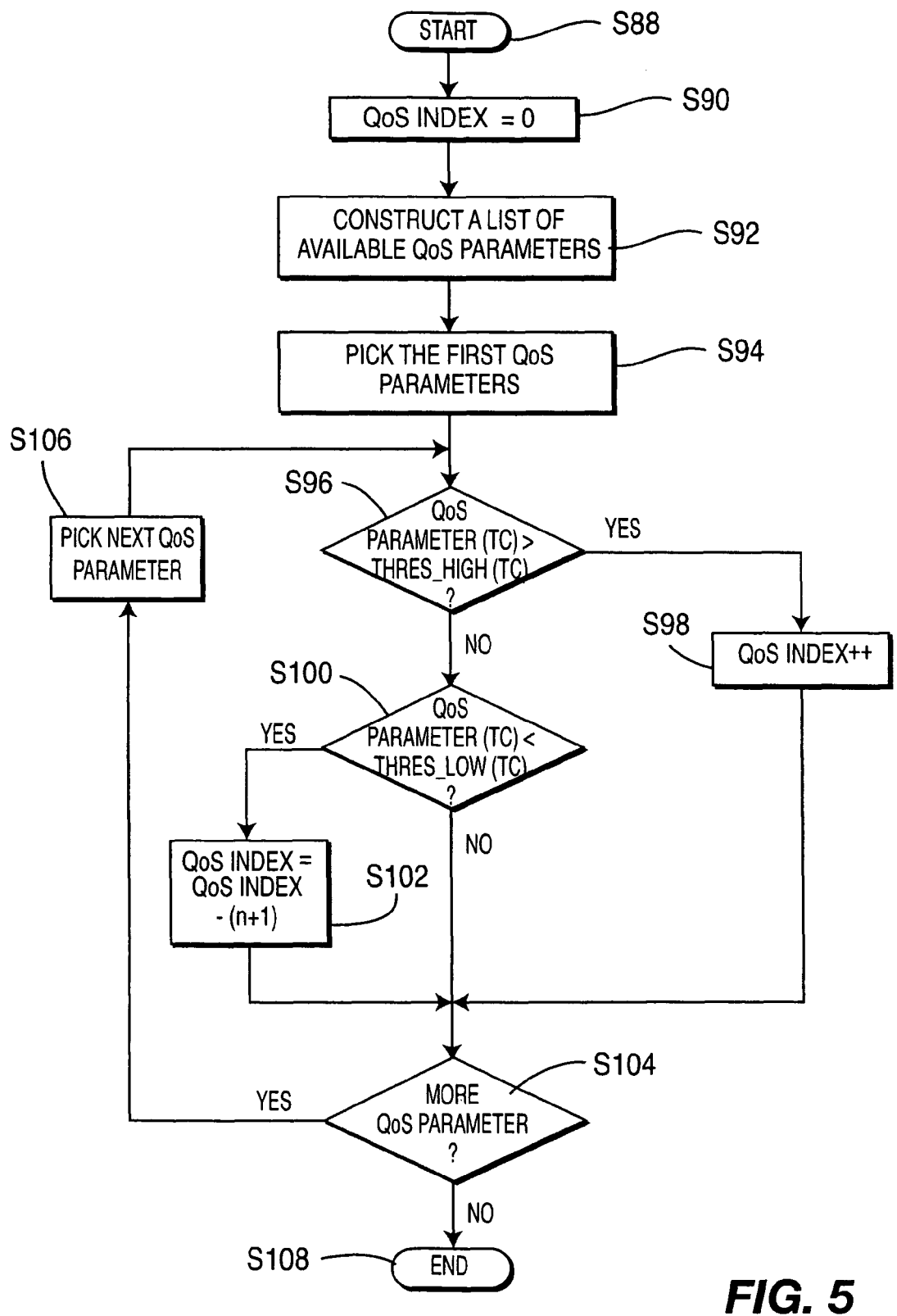
FIG. 5 is a flow chart of an embodiment of an algorithm for calculation of a QoS index, which may be employed by FIG. 4.

An embodiment of a QoS index calculation algorithm is shown in FIG. 5. Although the algorithm can be used in other applications, it is preferably used with steps S52 and S72 of FIG. 4. The QoS index is initially set to zero, steps S88, S90, and a list of available QoS parameters is created, step S92. The first QoS parameter in the list is selected, step S94. The selected QoS parameter is compared with the high threshold taken from the associated traffic class (TC), step S96. If the selected parameter is greater than the high threshold, the QoS index is incremented, step S98. Alternatively, if the QoS parameter is less than the high threshold and less than the low threshold, step S100, the QoS index remains unchanged. If the QoS parameter is less than both the high and low threshold, the present QoS index is decreased by n+1, where n is the total number of BSSs being examined, step S102. After one of these three (3) steps, S90, S100, S102 has been performed, it is determined if there are any more QoS parameters to be examined, step S104. In the event that there are more QoS parameters, the next QoS parameter is selected, step S106. Steps S96 to S104 are repeated until all of the QoS parameters have been examined. After all of the QoS parameters have been evaluated, the QoS index is produced, step S108.

Although FIG. 5 is one embodiment for producing a QoS index, others may be used. For example, the QoS index may be produced by weighting QoS parameters.

One application of the algorithms in FIGS. 4 and 5 can be with an 802.11e compliant AP and WTRU. Additionally, another application is with an 802.11b AP and WTRU with the needed parameters for the algorithm added to the 802.11 beacon and probe response frames or through proprietary signaling. These algorithms can be also applied to other wireless environments.

What is claimed is:

1. A method for triggering a handoff by a wireless transmit/receive unit (WTRU) from a current basic service set (BSS) in a wireless local area network (WLAN), comprising:
   determining a highest class of traffic service and quality of service (QoS) for the highest class from a basic service set (BSS) beacon;
   terminating a handoff and retaining communication with the current BSS when the signal to noise ratio (SNR) or received signal strength (RSS) is greater than a high threshold of the highest class;

calculating a quality of service (QoS) index by:
  setting a QoS index to zero;
  creating a list of QoS parameters;
  selecting one of the QoS parameters;
  comparing the selected QoS parameter with a high threshold for that QoS parameter; and
  incrementing the QoS index when the selected QoS parameter exceeds the high threshold for that QoS parameter; retaining the current QoS index when the selected QoS parameter equals the high threshold for that QoS parameter, and decrementing the QoS index when the selected QoS parameter is less than the high threshold for the selected QoS parameter;
determining a QoS index difference value between the selected BSS and the current BSS and comparing the QoS index difference value with a hysteresis;
updating the hysteresis value on a condition that the QoS index difference value is smaller than the hysteresis;
defining a minimum and maximum value of delay bounds, bandwidth requirements, and frame error rate for a plurality of traffic classes; and
evaluating the delay bounds, bandwidth requirements, and frame error rate to determine whether a handoff is desired when the SNR or RSS is less than the high threshold.

2. A wireless transmit/receive unit (WTRU) comprising:
a received signal strength (RSS)/signal to noise ratio (SNR) measuring device configured to measure the RSS or SNR of a beacon from each of a plurality of basic service sets;
a quality of service (QoS) index calculation device configured to:
  set a QoS index to zero;
  create a list of QoS parameters;
  select one of the QoS parameters;
  compare the selected QoS parameter with a high threshold for that QoS parameter; and
  increment the QoS index on a condition that the selected QoS parameter exceeds the high threshold for that QoS parameter;
  retain the current QoS index on a condition that the selected QoS parameter equals the high threshold for that QoS parameter; and
  decrement the QoS index on a condition that the selected QoS parameter is less than the high threshold for the selected QoS parameter;
a handover controller configured to:
  determine a highest class of traffic service and quality of service (QoS) for the highest class;
  terminate a handoff and retain communication with a current BSS on a condition that the signal to noise ratio (SNR) or received signal strength (RSS) is greater than a high threshold of the highest class; and
  determine a QoS index difference value between the selected BSS and the current BSS, compare the QoS index difference value with a hysteresis, and update the hysteresis value on a condition that the QoS index difference value is smaller than the hysteresis;
circuitry configured to define a minimum and maximum value of delay bounds, bandwidth requirements, and frame error rate for a plurality of traffic classes; and
circuitry configured to evaluate the delay bounds, bandwidth requirements, and frame error rate to determine whether a handoff is desired on a condition that the SNR or RSS is less than the high threshold.

3. An integrated circuit comprising:
a received signal strength (RSS)/signal to noise ratio (SNR) measuring device configured to measure the RSS or SNR of a beacon from each of a plurality of basic service sets;
a quality of service (QoS) index calculation device configured to:
  set a QoS index to zero;
  create a list of QoS parameters;
  select one of the QoS parameters;
  compare the selected QoS parameter with a high threshold for that QoS parameter; and
  increment the QoS index on a condition that the selected QoS parameter exceeds the high threshold for that QoS parameter; retain the current QoS index on a condition that the selected QoS parameter equals the high threshold for that QoS parameter, and decrement the QoS index on a condition that the selected QoS parameter is less than the high threshold for the selected QoS parameter;
a handover controller configured to:
  determine a highest class of traffic service and quality of service (QoS) for the highest class;
  terminate a handoff and retain communication with a current BSS on a condition that the signal to noise ratio (SNR) or received signal strength (RSS) is greater than a high threshold of the highest class; and
  determine a QoS index difference value between the selected BSS and the current BSS, compare the QoS index difference value with a hysteresis, and update the hysteresis value on a condition that the QoS index difference value is smaller than the hysteresis;
circuitry configured to define a minimum and maximum value of delay bounds, bandwidth requirements, and frame error rate for a plurality of traffic classes; and
circuitry configured to evaluate the delay bounds, bandwidth requirements, and frame error rate to determine whether a handoff is desired on a condition that the SNR or RSS is less than the high threshold.

\* \* \* \* \*